United States Patent Office 3,270,037
Patented August 30, 1966

3,270,037
6α-METHYL-3-OXO-Δ⁴-STEROIDS OF THE ANDROSTANE AND PREGNANE SERIES
Winifred June Adams, Bernard Ellis, Vladimir Petrow, and Isobel Ann Stuart-Webb, London, England, assignors to The British Drug Houses Limited, London, England, a British company
No Drawing. Filed June 19, 1956, Ser. No. 592,243
Claims priority, application Great Britain, June 22, 1955, 18,118/55
7 Claims. (Cl. 260—397.3)

This invention is for improvements in or relating to organic compounds and has particular reference to new 6α-methyl-3-oxo-Δ⁴-steriods of the androstane and pregnane series.

It is an object of the invention to provide new compounds of the androstane and pregnane series which are of value on account of their biological properties, for example as anabolic or progestational agents.

The invention provides new 6α-methyl-3-oxo-Δ⁴-steroids of the androstane and pregnane series having the general formula

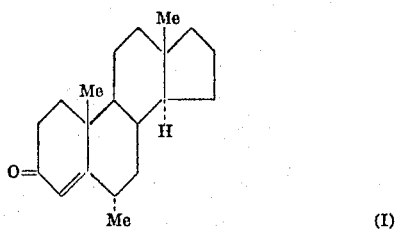

and in particular the compounds 17β-hydroxy-6α-methylandrost-4-en-3-one (6α-methyltestosterone), 17β-hydroxy-6α:17α-dimethylandrost-4-en-3-one (6α:17α-dimethyltestosterone), 17α-ethinyl-17β-hydroxy-6α-methylandrost-4-en-3-one (6α-methyl ethisterone), and 6α-methylpregn-4-ene-3:20-dione (6α-methylprogesterone).

According to the present invention there is provided a method for the preparation of 6α-methyl-3-oxo-Δ⁴-steroids of the androstane and pregnane series having the general Formula I above, which method comprises treating a 3β:5α-dihydroxy-6β-methyl steriod of the androstane and pregnane series having the general formula

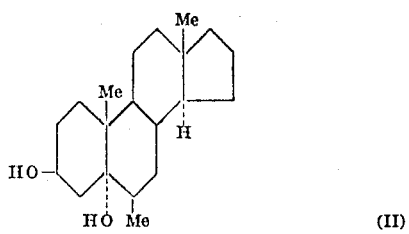

with an aluminium alkoxide in cyclohexanone/toluene under reflux. With the use of e.g. aluminium tert.-butoxide in cyclohexanone/toluene under reflux (i.e. the Oppenauer oxidant), oxidation occurs at the 3 position, accompanied by dehydration of the 5α-hydroxyl group to give a 6β-methyl-3-oxo-Δ⁴-steriod which will undergo epimerisation at C₆ to give the 6α-methyl-3-oxo-Δ⁴-steroid.

Alternatively, the 3β:5α-dihydroxy-6β-methyl steroid of the androstane or pregnane series may be converted into the desired 6α-methyl-3-oxo-Δ⁴-steroid via the 6β-methyl-3-oxo-Δ⁴-steroid by epimerisation. The 6β-methyl-3-oxo-Δ⁴-steroid may be treated with an alkaline reagent, e.g. potassium hydroxide, or an acidic reagent, e.g. hydrochloric acid, in, for example, an aqueous organic solvent mixture such as aqueous alcohol under reflux and under nitrogen for several hours, when epimerisation of the 6β-methyl group occurs.

The 3β:5α-dihydroxy-6β-methyl steroid of the androstane or pregnane series may also be converted into the 6α-methyl-3-oxo-Δ⁴-steroid via the 3β-hydroxy-6β-methyl-Δ⁴-steroid. The 3β-hydroxy-6β-methyl-Δ⁴-steroid may be oxidised with a mild oxidant such as manganese dioxide, or the reagent formed by dissolving aluminium tert.-butoxide in a mixture of acetone and isopropanol, to give the 6β-methyl-3-oxo-Δ⁴-steroid which may then be isomerised to the 6α-methyl epimer by alkaline or acidic reagents.

In a further method of preparing the 6α-methyl-3-oxo-Δ⁴-steroids of the androstane and pregnane series, a 5α-hydroxy-6β-methyl-3-oxo-steroid may be treated with an acidic dehydrating agent such as, for example, a very dilute solution of hydrochloric acid in an alkanol containing up to four carbon atoms or with aluminium tert.-butoxide in toluene, when dehydration and epimerisation will occur to give the 6α-methyl-3-oxo-Δ⁴-steroid.

Hydroxyl groups (other than those at C₃ and C₅) and oxo-groups (other than that at C₃) present in the intermediates leading to (1) which may undergo change during the oxidation and dehydration reactions, will naturally be protected in suitable manner by methods well known to those skilled in the art, and subsequently regenerated.

The choice of procedure for the preparation of any particular 6α-methyl-3-oxo-Δ⁴-steroid described herein depends upon the nature of the substituents borne by the immediate precursor.

Following is a description by way of example of methods of carrying the invention into effect:

EXAMPLE 1

6α-methyltestosterone

6β-methyltestosterone (100 mg.), prepared by the method set forth in copending application Serial No. 590,119, filed on June 8, 1956, now abandoned, in methanol (36 ml.) was heated with potassium hydroxide (400 mg.) under reflux in a stream of nitrogen for 20 hours. After dilution with water and acidification with acetic acid, the product was extracted with ether. Removal of the ether left a crystalline residue which was purified from ethanol to give 6α-methyltestosterone, M.P. 154 to 155° C., $[\alpha]_D^{26°}$ +90° (c., 0.34 in chloroform), $\lambda_{max}$ 241 mμ (4.2) in isopropanol.

EXAMPLE 2

6α-methylandrost-4-ene-3:17-dione (a) A solution of 5α-hydroxy-6β-methylandrostane-3:17-dione (400 mg.) in dry toluene (40 ml.) was slowly distilled until a few mls. of solvent had been removed. A solution of aluminium tert.-butoxide (800 mg.) in toluene was added and distillation continued for a further 25 minutes. Rochelle salt solution was added and the product isolated with ether. After evaporation of the ether, the residue was dissolved in benzene and percolated through a short column of alumina. Crystallisation from acetone/hexane gave 6α-methylandrost-4-ene-3:17-dione, needles or prisms, M.P. 167 to 168° C., $[\alpha]_D^{22°}$ +172° (c., 0.344 in chloroform).

(b) 6β-methylandrost-4-en-3:17-dione (25 mg.) in methanol (9 ml.) was refluxed for 19 hours under nitrogen with potassium hydroxide (100 mg.) in water (1 ml.). The mixture was neutralised with acetic acid, and the product isolated with ether. 6α-methylandrost-4-en-3:17-dione was obtained, crystallising from acetone/hexane in needles, M.P. 162° C., not depressed on admixture with a specimen prepared by method (a) above.

EXAMPLE 3

17β-hydroxy-6α:17α-dimethylandrost-4-en-3-one (a) A solution of 6β:17α-dimethylandrostane-3β:5α:17β-triol (1.2 g.), prepared by the method set forth in copending application Serial No. 587,447, filed on May 28, 1956, now Pat. No. 2,915,364, in cyclohexanone (8.2 ml.) was added to a solution of aluminium tert.-butoxide (1.1 g.) in toluene (5 ml.) and the mixture heated under reflux for 45 minutes. Benzene (ca. 50 ml.) was added, and the solution washed with dilute sulphuric acid and water. The solution was steam-distilled for 4 hours then extracted with ether. The extract was washed with water, dried and evaporated. The residue in benzene was run through a column of alumina (10 g.) and the resulting oily product was crystallised from acetone/hexane. 17β-hydroxy-6α:17α-dimethylandrost-4-en-3-one (6α:17α-dimethyltestosterone) separated in needles, M.P. 134 to 135° C., [α]$_D^{23°}$ +49° (c., 0.421 in ethanol), λ$_{max}$ mμ (4.19) in isopropanol.

(b) A solution of 5α:17β-dihydroxy-6β:17α-dimethylandrostane-3-one (700 mg.) and aluminium tert.-butoxide (1.4 g.) in toluene (110 ml.) was refluxed for 1 hour, cooled, shaken with aqueous Rochelle salt, and extracted with ether. The ethereal solution was washed and the solvents removed by steam-distillation. The product, in benzene, was percolated through a short column of alumina to give an oil which crystallised from acetone/hexane. 6α:17α-dimethyltestosterone formed needles, M.P. 129 to 131° C., alone or on admixture with a specimen prepared by method (a) above.

(c) 5α:17β-dihydroxy-6β:17α-dimethylandrostan-3-one (2.12 g.) in ethanol (140 ml.) was heated under reflux with concentrated hydrochloric acid (0.35 ml.) for 30 minutes. After dilution with water (1 litre), the mixture was left overnight at 0° C., and the precipitated crystals collected and purified from acetone/hexane. 6α:17α-dimethyltestosterone formed prisms, M.P. 136 to 137° C., [α]$_D^{20}$ +66° (c., 0.88 in chloroform).

EXAMPLE 4

6α-methylethisterone (a) 6β-methylethisterone (1.5 g.), prepared by the method set forth in copending application Serial No. 590,119, filed on June 8, 1956, in aqueous ethanol (60 ml. of 95%) containing potassium hydroxide (1.5 g.) was heated under reflux for 5 hours. The mixture was diluted with water, the product extracted with ether, and the washed and dried extract concentrated to low volume. The crystalline deposit was purified from aqueous methanol to give 17α-ethinyl-17β-hydroxy-6α-methylandrost-4-en-3-one (6α-methylethisterone), prisms, M.P. 195 to 197° C., [α]$_D^{20}$ +34.5° (c., 0.87 in chloroform).

(b) A solution of 5α:17β-dihydroxy-17α-ethinyl-6β-methylandrostan-3-one (8.5 g.) in ethanol (250 ml.) was treated with 6 drops of concentrated hydrochloric acid and the mixture refluxed for 30 minutes. The product was taken into ether (1.5 litres), and the solution washed, dried, and concentrated to low volume. 6α-methylethisterone separated in dense crystals, M.P. 195 to 197° C., identical with a sample prepared by method (a) above.

EXAMPLE 5

6α-methylprogesterone (a) 6β-methylprogesterone (600 mg.), prepared by the method set forth in copending application Serial No. 590,119, filed on June 8, 1956, in methanol (25 ml.) was heated with potassium hydroxide (500 mg.) in water (5 ml.) under reflux in a stream of nitrogen for 16 hours. The product was isolated with ether and yielded 6α-methylpregn-4-ene-3:20-dione (6α-methylprogesterone) as flaky needles, M.P. 122 to 123° C., [α]$_D^{27}$ +177° (c., 1.05 in chloroform), after crystallisation from aqueous methanol.

(b) A solution of 5α-hydroxy-6β-methylallopregnane-3:20-dione (500 mg.) in ethanol (40 ml.) was treated with 3 drops of concentrated hydrochloric acid and the mixture refluxed for 30 minutes. Concentration of the solution, followed by addition of water and cooling, gave 6α-methylprogesterone, M.P. 121 to 123° C., after recrystallisation from aqueous methanol.

(c) 6β-methylprogesterone (1 g.) in ethanol (80 ml.) was treated with 4 drops of concentrated hydrochloric acid and the mixture refluxed for 30 minutes. 6α-methylprogesterone, M.P. 121 to 123° C., was obtained after working up as described in (b) above.

We claim:
1. 6α:17α-dimethyltestosterone.
2. 17α-ethinyl-17β-hydroxy-6α-methylandrost-4-en-3-one.
3. 6α-methylprogesterone.
4. A method for the preparation of 6α-methyl-3-oxo-Δ$^4$-steroids of the androstane and pregnane series which method comprises treating the corresponding 6β-methyl-3-oxo-Δ$^4$-steroid with a reagent selected from the group consisting of strongly ionizable acids and alkalis under reflux and under nitrogen for several hours.
5. A method for the preparation of 6α-methyl-3-oxo-Δ$^4$-steroids of the androstane and pregnane series which method comprises treating the corresponding 5α-hydroxy-6β-methyl-3-oxo-steroid with aluminium tert.-butoxide in toluene to give the 6α-methyl-3-oxo-Δ$^4$-steroid.
6. A method for the preparation of 6α-methyl-3-oxo-Δ$^4$-steroids of the androstane and pregnane series which method comprises treating the corresponding 5α-hydroxy-6β-methyl-3-oxo-steroid with an acidic dehydrating agent comprising a strongly ionized acid in an alkanol containing up to four carbon atoms to effect dehydration and epimerization to give said 6α-methyl-3-oxo-Δ$^4$ steroid.
7. A method for the preparation of 6α-methyl-3-oxo-Δ$^4$ steroids of the androstane and pregnane series, which method comprises treating a corresponding 3β:5α-dihydroxy-6β-methyl steroid of said series with an aluminum alkoxide in cyclohexanone and toluene under reflux.

References Cited by the Examiner
UNITED STATES PATENTS

| | | | |
|---|---|---|---|
| 2,308,835 | 1/1943 | Ruzicka et al. | 260—397.4 |
| 2,598,648 | 5/1952 | Miescher et al. | 260—397.4 |
| 2,740,798 | 4/1956 | Ralls | 260—397.45 |

LEWIS GOTTS, *Primary Examiner.*

LESLIE H. GASTON, ELBERT L. ROBERTS,
*Examiners.*

O. RAMSEY, B. G. COLLEY, R. E. WEXLER,
*Assistant Examiners.*